United States Patent [19]

Griffin

[11] 4,441,522

[45] Apr. 10, 1984

[54] PIGGABLE MULTICHAMBER FLUID SWIVEL

[75] Inventor: Michael D. Griffin, Mission Hills, Calif.

[73] Assignee: Amtel, Inc., Providence, R.I.

[21] Appl. No.: 204,801

[22] Filed: Nov. 7, 1980

[51] Int. Cl.³ ............................................. F16L 27/06
[52] U.S. Cl. ..................................... 137/615; 137/580; 285/136; 285/190; 15/3.5; 15/104.06 R
[58] Field of Search ................. 285/136, 190; 137/580, 137/615, 236 S; 15/104.06 R, 3.5

[56] References Cited

U.S. PATENT DOCUMENTS

| | | | |
|---|---|---|---|
| 3,698,433 | 10/1972 | Dobler et al. | 285/190 |
| 4,126,336 | 11/1978 | Ortloff et al. | 285/190 |
| 4,174,127 | 11/1979 | Carn et al. | 285/190 |
| 4,183,559 | 1/1980 | Stafford et al. | 285/190 |
| 4,250,918 | 2/1981 | Tuson et al. | 285/134 |

Primary Examiner—A. Michael Chambers

Attorney, Agent, or Firm—Freilich, Hornbaker, Rosen & Fernandez

[57] ABSTRACT

A fluid swivel is described, of the type which includes an annular chamber formed at the interface between the stationary and rotatable parts of the swivel, which facilitates the passage of a pig through the chamber. A pig diverter device lies beside the outlet formed in one of the parts through which fluid normally exits the chamber, to divert a pig moving through the chamber into the outlet. The diverter device can include a projection lying on the downstream side of the outlet. The projection can extend radially only up to the interface between the two swivel parts, to facilitate disassembly of the swivel. The diverter device can also include a valving mechanism that can shut off fluid flow immediately downstream of the outlet, to direct the fluid stream and pig into the outlet, and the upstream end of the outlet can extend tangent to the chamber to facilitate pig entry therein. The interface between the stationary and rotatable parts of the swivel can lie off of the center of the annular chamber, while the chamber still has a largely circular cross section to facilitate movement of the pig.

10 Claims, 8 Drawing Figures

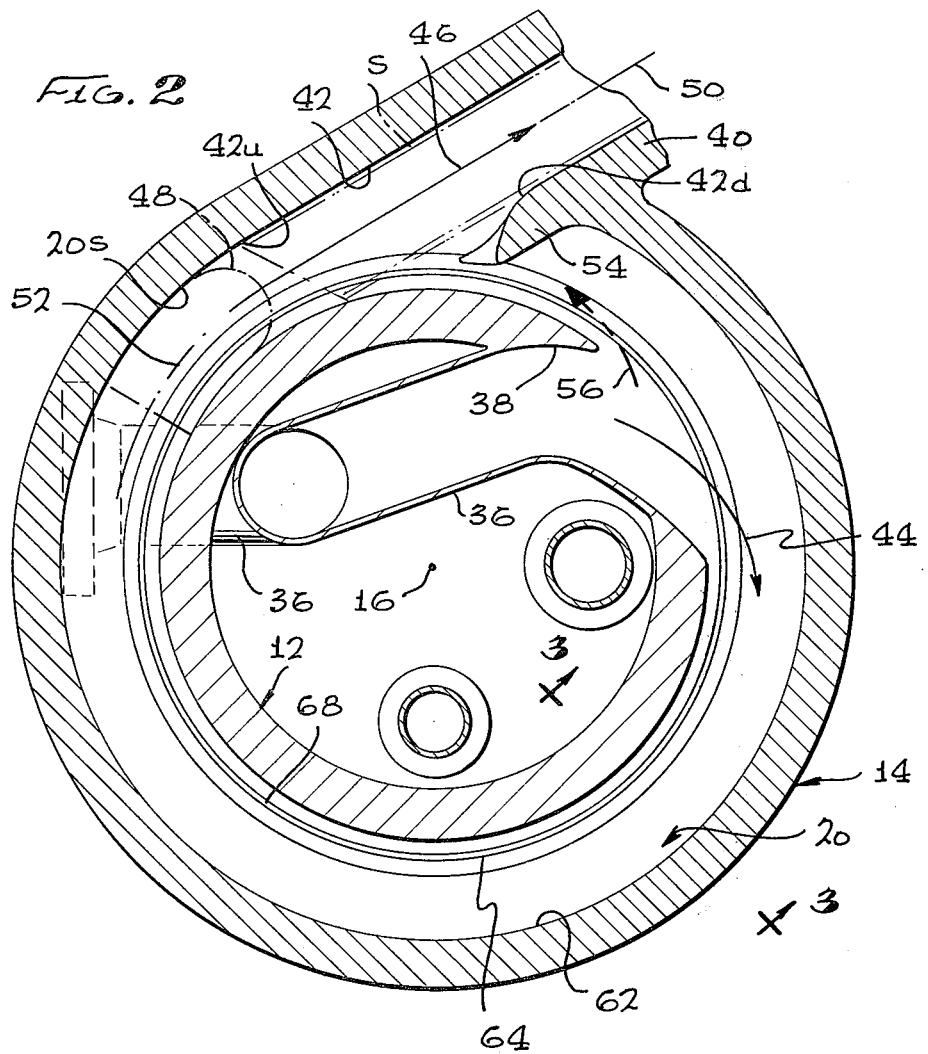
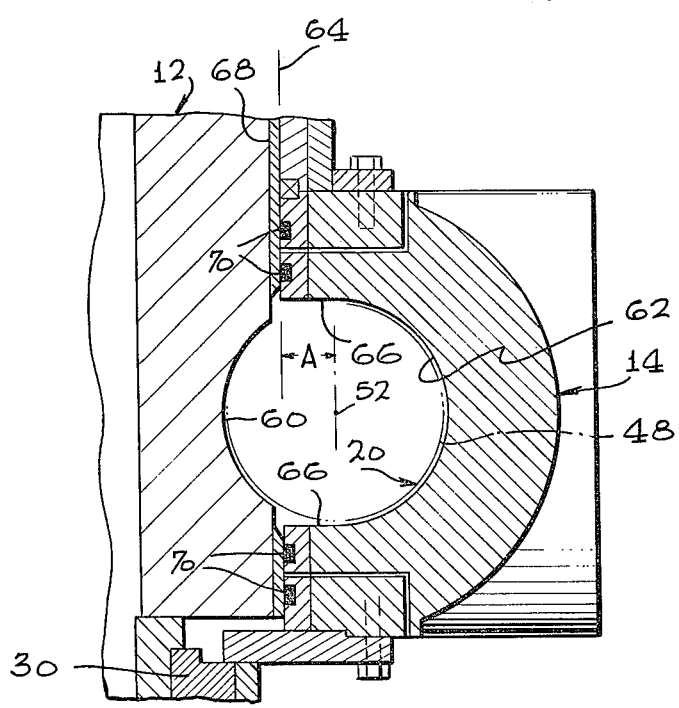

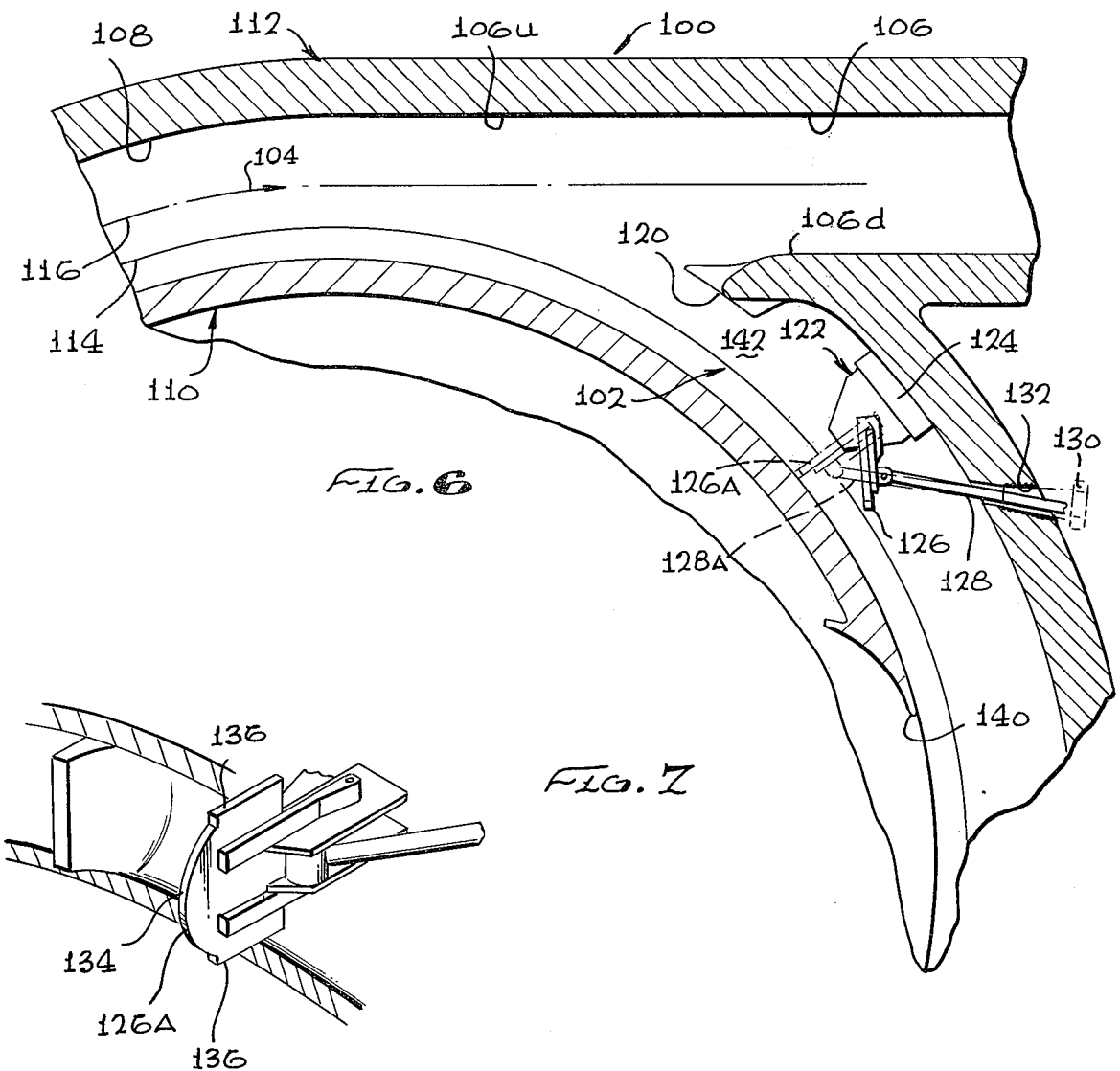

PIGGABLE MULTICHAMBER FLUID SWIVEL

BACKGROUND OF THE INVENTION

Fluid conduits, such as those utilized to transport crude oil to a tanker, can be cleaned by the use of a pig forced through the conduit by pressured oil. While the pig can be easily forced through a simple fluid swivel, difficulties can be experienced in forcing the pig through a multi-chamber type of fluid swivel. A fluid swivel of this type, such as is shown in U.S. Pat. No. 3,082,440 by Rhedin, includes one or more annular chambers formed between the stationary and rotatable parts of the swivel. It is possible for a pig entering the chamber to move in an endless circle about the chamber and never reach the outlet. It is also possible for the pig to become stuck at the outlet of the chamber, or elsewhere in the chamber, while pressured oil merely flows around the pig. It would be desirable to provide a device that assured movement of the pig through an annular chamber of a fluid swivel into the outlet. It would also be desirable if such an apparatus did not interfere with disassembly of the fluid swivel.

SUMMARY OF THE INVENTION

In accordance with one embodiment of the present invention, an annular fluid swivel apparatus is provided, which enables the passage of a pig through the annular chamber and into the outlet thereof in a reliable manner. The apparatus includes inner and outer swivel parts rotatable on one another and forming an annular chamber of largely circular cross section between them, and with one of the swivel parts having an inlet to deliver material to the annular chamber and the other having an outlet to receive material from the chamber. A pig diverter device is mounted to lie within the annular chamber at a position beside the outlet, to divert a pig into the outlet.

The diverter can include a projection lying beside the downstream side of the outlet. The projection can extend only up to the interface between the two swivel parts, to facilitate disassembly of the fluid swivel by the raising of the outer swivel part off of the inner part. The diverter device can also include a valving mechanism on the downstream side of the outlet, that can shut off fluid flow, to thereby assure that almost all of the fluid stream moves into the outlet so the pig following the stream also enters the outlet. The interface between the stationary and rotatable parts of the swivel, can lie off of the center of the largely circular cross section of the chamber, to facilitate the mounting of the pig diverter. A rotatable outer fluid swivel part, can be formed with an outlet whose upstream end is tangent to the outside of the annular chamber of largely circular cross section, to facilitate the entry of the pig into the outlet.

The novel features of the invention are set forth with particularity in the appended claims. The invention will be best understood from the following description when read in conjunction with the accompanying drawings.

BRIEF DESCRIPTION OF THE DRAWINGS

FIG. 2 is a view taken on the line 2—2 of FIG. 1.

FIG. 3 is a view taken on the line 3—3 of FIG. 2.

FIG. 6 is a partial sectional view of a fluid swivel apparatus constructed in accordance with another embodiment of the invention.

FIG. 7 is a partial sectional perspective view of the apparatus of FIG. 6.

FIG. 8 is a partial sectional view of a fluid swivel constructed in accordance with another embodiment of the invention.

DESCRIPTION OF THE PREFERRED EMBODIMENTS

Figure 1:
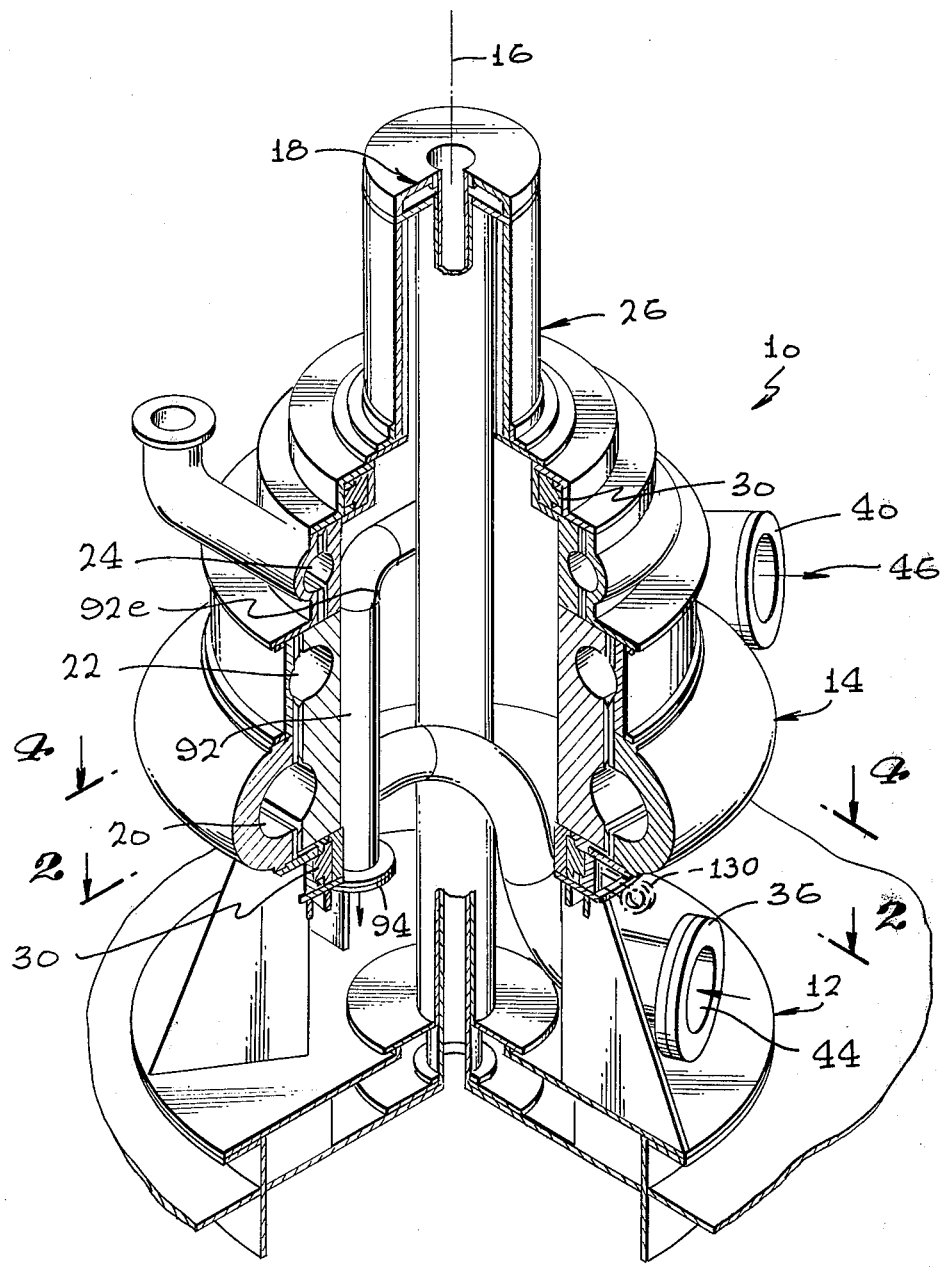
FIG. 1 is a partially sectional, perspective view of a multi-chamber fluid swivel apparatus constructed in accordance with the present invention.

FIG. 1 illustrates a multi-chamber fluid swivel 10, which is commonly referred to as a MPDU (multiple product distribution unit) designed for use on an offshore terminal where oil from wells is transferred to tankers. The MPDU, or fluid swivel unit, includes a stationary part 12 that may lie above the sea surface on an anchored buoy, and which may be connected through underwater hoses to various pipelines at the sea floor. The "stationary part" can shift position and rotate by a limited amount, but cannot rotate without limit about a vertical axis. The MPDU also includes a rotatable outer part 14 that is connected through hoses or pipes to a ship, and which can rotate without limit about a vertical axis 16, on a pair of bearings 30, to follow drifting of a moored ship. The fluid swivel unit couples several independent fluid conduits including an axial conduit forming a fluid swivel 18 (which can be utilized, instead, to carry electrical conductors) lying on the axis of rotation, three additional product-carrying swivels forming annular chambers 20, 22, and 24 extending around the axis of rotation, and several additional swivels for carrying hydraulic fluids and located at 26 near the top of the unit. In one unit, the chamber 20 is utilized to transfer crude oil from an undersea well to a ship, the chamber 24 is utilized to transfer gas from the undersea well to the ship, and the chamber 22 is utilized to transfer water from the ship to the well for reinjection. In addition to the axial swivel 18 through which a pig can be easily passed, the three chambers 20-24 are made piggable in accordance with the present invention. It may be noted that a MPDU has numerous rotating seals that may become damaged or worn, and the unit is designed to enable rapid disassembly for maintenance. This can be accomplished by unscrewing various bolts and then lifting the rotatable part 14 off the nonrotatable part 12.

A pig is typically in the form of a solid plastic cylinder with a rounded noise, and of a diameter which is about the same as that of the conduit to be cleaned. The pig can be moved through the conduit by the pressure of fluid behind the pig, to enable the pig to scrape out material that has settled in the conduit and that might eventually block it. The passage of a pig through an annular chamber of a MPDU can be difficult to achieve, since the pig may become trapped in the annular chamber rather than passing into the outlet. Trapping can occur by the pig moving in a continuous circle in the chamber, or by becoming trapped at the outlet of the chamber.

FIGS. 2 and 3 illustrate some of the details of the fluid swivel at the location of the conduit 20 through which crude oil may be passed from the stationary inner part 12 of the unit to the rotatable outer part 14. The stationary part 12 has an inlet pipe 36 through which oil is received and which leads to an inlet 38 of the annular chamber 20. The rotatable part 14 has an outlet pipe 40 which extends from an outlet 42 of the annular chamber. Oil can flow into the chamber and out of it, as indicated by the arrows 44 and 46, at any rotational position of the outer unit part 14 with respect to the inner part 12. The fluid conduit, including the annular chamber 20, can be cleaned by the use of a pig indicated at 48, which can follow the same route into the chamber along the arrow 44, around the chamber, and out of the chamber along the arrow 46. It may be noted that while oil can be transferred at any rotational position of the unit, pigging should not be performed while the unit is within about a 30° angle of its 360° of possible positions. In the particular orientation shown in FIG. 2, the pig will clean out almost all of the annular chamber 20. However, a major purpose of pigging is typically to clean out pipes and hoses leading to and from the swivel unit, which is more easily accomplished by allowing the pig to also travel through the swivel unit. It also may be noted that a piggable fluid swivel also allows the passage of a tool that may be used to operate underwater valves or the like.

The entrance of the pig into the annular chamber 20 through the inlet 38 is unlikely to be stopped, since there is oil pressure behind the pig. However, precautions must be taken to assure that the pig leaves the chamber through the exit 42. Such precautions must be taken to prevent the pig 48 from merely traveling in a continuous circle through the chamber 20, from becoming jammed at the downstream side 42d of the exit while oil passes around the rear end of the pig, or from becoming split at the downstream end of the exit. Exiting of the pig is facilitated by orienting the outlet 42, and particularly the upstream end 42u of the outlet, so that it is tangent to the radially outer side or periphery 20s of the annular chamber 20. Also, the straight centerline 50 of the outlet is aligned with the circular centerline 52 of the annular chamber. Although a pig is moving in a circle around the annular chamber 20, it tends to move tangential whenever it is not confined to move in a circle. Thus, the tangential upstream side 42u of the outlet provides minimal resistance to the exiting of the pig. The term "upstream" side of the outlet, refers to the side which first encounters fluid moving in the normal direction around the chamber, with the normal direction being apparent by the directions in which the inlet 38 and outlet 42 open to the chamber 20 when they are directed at least partially tangential to the chamber as in the figures herein.

Another way in which exiting of the pig through outlet 42 is encouraged, is by the use of a pig diverter device or apparatus in the form of a projection 54 lying at the downstream side 42d of the outlet. The deflector or projection 54 serves to abut the front end of a pig that tends to not exit, to divert the pig into the exit. In addition, the projection 54 tends to block oil from flowing in a continuous circle around the annular chamber 20 instead of flowing into the outlet 42, as well as blocking the flow of oil in the reverse direction indicated by arrow 56 to bypass the pig.

As shown in FIG. 3, the stationary inner part of the unit has a recess 60, and the rotatable part 14 has a recess 62, with the two recesses 60, 62 opposite to one another to form the chamber 20. The recess 62 in the rotatable part is much deeper than the other recess 60, so that the interface 64 of the swivel unit is radially spaced a distance A from the center line 52 of the annular chamber. This enables the projection 54 to extend more than halfway across the width of the annular chamber 20, to better deflect a pig and to better block off oil flow, so as to encourage flow into the outlet of the chamber. The recess 60 in the stationary part extends by about one-third of a circle. The recess 62 in the rotatable part includes a semi-circular portion, and also includes a pair of straight portions 66. These straight or flat portions 66 are provided to avoid the presence of a lip that might act as a pig barrier at the inlet and outlet of the chamber. It may be noted that the inner swivel part 12 includes a seal covering 68 which is cutaway at locations in line with the flat portions 66 of the outer swivel part. Also, the rotatable part 14 of the swivel unit includes grooves with seals 70 therein that seal to the seal covering 68.

The flat surfaces 66 on the rotatable part of the swivel unit provide gaps that result in deviation from a circular cross section for the chamber 20. However, the chamber is of largely circular cross section, and the gaps are relatively small, so that only a samll amount of fluid can escape around the pig 48 which is of circular cross section. It may be noted that a pig of resilient plastic material such as polyethylene, is of considerable resilience when subjected to the pressures of perhaps 100 psi at which oil may be pumped through the conduits, and the exact deformed shape of the pig is difficult to predict. Where the fluid pumped behind the pig is of relatively high viscosity such as in the case of typical crude oil, the pig can be effectively pumped through the conduit despite considerable gaps around it. Where the pumping fluid is of very low viscosity, as in the case of gas, the fluid easily escapes around the pig and precautions must be taken to prevent large gaps that would allow the pig to stall in the conduit.

Figure 4:
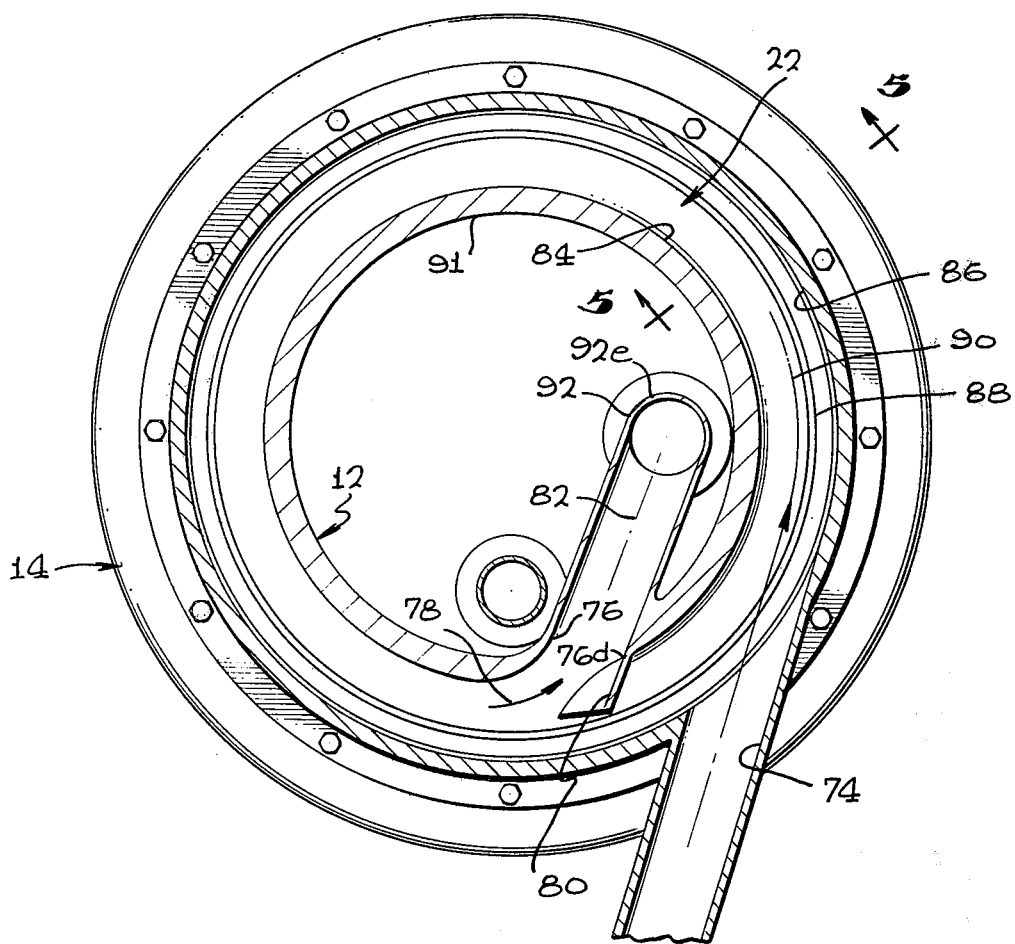
FIG. 4 is a view taken on the line 4—4 of FIG. 1.

As mentioned above, the annular chamber 22 shown in FIG. 1, is utilized to pump water for reinjection in an undersea well, and therefore the inlet for the chamber 22 is on the rotatable part 14 of the fluid swivel rather than on the stationary part. FIG. 4 shows that the inlet 74 of the annular conduit extends tangent to the annular conduit 22. However, the outlet 76 of the conduit cannot easily be made to extend tangent to the annular chamber. The deflection of a pig along the path indicated by arrow 78, is enhanced by the use of a projection 80 extending from a location beside the downstream side 76d of the outlet into the annular chamber 22. The particular projection 80 extends in about a half circle, up to the center line 82 of the outlet. As in the case of the fluid swivel portion shown in FIGS. 2-3, the projection 80 in FIG. 4 serves both to physically deflect the front of a pig into the outlet, and to also help shut off the flow of oil past the projection so that the oil tends to flow into the outlet 76 and to carry the pig along with it.

Figure 5:
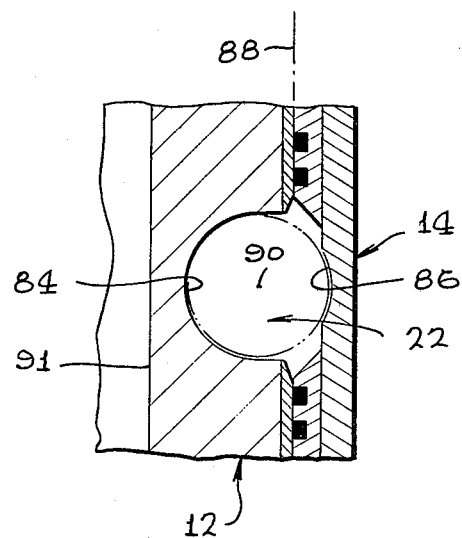
FIG. 5 is a view taken on the line 5—5 of FIG. 4.

FIG. 5 shows that the recess 84 in the inner stationary swivel part is deeper than the recess 86 in the rotatable part 14, so that the interface 88 lies a distance outward from the center line 90 of the annular chamber. This permits the projection 80 to extend more than halfway across the annular chamber 22.

It may be noted that instead of utilizing a projection lying solely on the downstream side of the center line of the outlet, as is shown in the particular examples of FIGS. 2 and 4, it would be possible to provide a sleeve of smaller diameter than the outlet pipe, and that extends from the annular chamber to the outlet, and with the end of the sleeve that lies in the chamber being countoured to completely block the chamber. Such a sleeve is indicated in FIG. 2 at S. One disadvantage of such a sleeve is that the fluid swivel could not be taken apart by lifting the rotatable outer part 14 off of the stationary inner part 12, without first withdrawing the sleeve S. In the case of the chamber of FIG. 2 wherein the outlet is formed in the rotatable outer part 14, a mechanism can be provided to withdraw the sleeve, although this adds some complexity to the apparatus. In the case of a fluid swivel such as that shown in FIG. 4, wherein the outlet extends into the radially inner stationary part 12, the provision of a mechanism for withdrawing the sleeve could result in a larger and more costly unit. A larger unit could result, because a mechanism for withdrawing the sleeve would require additional space in the hollow center region 91 of the stationary swivel part 12. This could require a somewhat larger hollow space 91 to provide room for such a mechanism, and a larger diameter fluid swivel can result in a considerably increased cost for the swivel unit. Instead, the projection 80 of FIG. 4 lies inside the interface 88, so that no withdrawal of parts is required to disassemble the swivel unit. As a consequence, an outlet pipe 92 which extends from the outlet 76, can be in the form of a substantially continuous pipe with an elbow 92e formed therein immediately beyond the outlet 76. The elbow allows the pipe to extend downwardly, with the first connecting flange 94 located below the bottommost annular chamber 20, as can be seen in FIG. 1. It may be noted that where the conduit is to be piggable, it is desirable to avoid sharp bends in the conduit, and it is normally desirable to provide a minimum bend radius at any elbow which is at least 1½ times greater than the inside diameter of the conduit.

FIGS. 6 and 7 show a fluid swivel 100 that includes a diverter device 102 which provides even more reliable diversion of a pig moving in the direction of arrow 104 into a fluid swivel outlet 106. The construction of this fluid swivel portion is somewhat similar to that of FIGS. 2 and 3, with the annular chamber 108 formed by recesses in a stationary member 110 and a rotatable member 112 having an interface at 114, and with the center line of the annular chamber lying on the circle 116. The pig diverter device 102 includes a projection 120 lying beside the downstream side 106d of the fluid outlet, and a shut-off valve 122 that closes off the annular chamber 108 at a location on the downstream side of the outlet.

The shutoff valve 122 includes a mount 124 mounted at the inside of the annular chamber on the rotatable part 112 of the fluid swivel, a valve member or flapper 126 movably held on the mount 124, and an actuator 128 that moves the flapper. During normal operation of the fluid swivel, the valve 122 is closed, which is accomplished by pushing on a threadable plug 130 at the end of the actuator 128, to move the actuator to the position 128A wherein it pivots the flapper to the closed position shown at 126A. The actuator is locked in the closed position by turning the threaded plug 130 to thread it and seal it into a threaded hole 132 formed in the outer or rotatable fluid swivel part 112. It can be seen that in the position 126A, the flapper extends across the fluid swivel interface 114, so that it can shut off almost all liquid flow thereby. It can be seen in FIG. 7, that the flapper at 126A has a partially cylindrical portion 134 and lip portions 136 to closely fit the contour of the annular chamber.

The combination of the closed valve 122 which causes fluid flow into the outlet 106, and the orientation of the outlet 106 so its upstream end at 106u is tangent to the outer walls of the annular chamber, causes the pig to move into the outlet. The presence of the projection 120 on the downstream side of the outlet, provides greater assurance that the pig will move into the outlet and will not be trapped at the intersection of the outlet with the annular chamber. A pig moving so it is not quite aligned with the outlet 106 will be guided into the outlet by the rounded end of the projection 120. It may be noted that the projection 120 does not even extend to the center line 116 of the annular chamber. This construction is utilized, to enable the flow of fluid from the inlet 140 to the outlet 106 even when the swivel is turned to a position at which the inlet 140 opens to the space 142 between the projection 120 and the closed valve 122. A longer projection can be utilized if the valve is placed very close to the projection.

When the fluid swivel of FIG. 6 is to be disassembled for maintenance, the threaded plug 130 can be loosened and pulled out to withdraw the actuator 128. The valve member or flapper 126 then withdraws to an open valve position behind the interface 114, so it does not interfere with the lifting off of the rotatable fluid swivel part 112. It may be noted that with the plug 130 removed, a rod at the rearward end of the actuator 128 fits loosely in the hole 132. However, there should not be substantial oil leakage through this hole, since the fluid conduit will have been drained of oil (or other fluid) prior to readying it for disassembly.

FIG. 8 illustrates a fluid swivel somewhat similar to that of FIG. 4, wherein the outlet 150 through which the pig exits, is on the inner part 152 of the fluid swivel. However, the pig diverter device 154 includes not only a projection 156 lying at the downstream end 150d of the outlet, but also a shut-off valve 156 having a construction and mode of operation largely similar to the valve 122 described in connection with FIGS. 6 and 7. It may be noted that the valve 156, as well as the valve 122 in FIG. 6, can be operated in a simple manner, and does not require an extension of the outlet 150 to accommodate a diverting sleeve. This is especially important in the case of the fluid swivel which has an outlet on the radially inner part of the swivel, and where the need for a longer inwardly extending pipe 92 could require a larger diameter fluid swivel which would be of considerably greater cost.

Each of the fluid swivels discussed above, is piggable throughout most of the rotational position of the rotatable fluid swivel; only along an angle of about 30° would a pig become trapped or damaged by hitting the pig diverter. The fluid swivel is installed, with due consideration taken as to the direction of prevailing winds, so that the prevailing winds normally hold a vessel and orient the fluid swivel at a position wherein the swivel can readily pass a pig therethrough. Within this wide range of fluid swivel orientation, fluid does not tend to be trapped between a projection such as 120 in FIG. 6 and the valve 122 therein. Of course, even at the exact angular position at which fluid tends to be trapped between the projection 120 and valve 122, the fluid can nevertheless flow around the projection 120 into the outlet, with only a moderate increase in resistance.

The offshore installation which includes the fluid swivel 10, will also include a rotatable vessel mooring device which moors a vessel to the same buoy or platform on which the fluid swivel is mounted. Where very light mooring loads are expected, the mooring device could be an eyelet 130 (FIG. 1) to hold a hawser that extends to a vessel, although such a mooring device would normally be separately rotatably mounted on the buoy about axis 16 and might include a heavy duty yoke. The rotatable fluid swivel part 14 is preferably oriented with respect to the mooring device, so the outlet such as 42 (FIG. 2) of the annular chamber is seldom aligned with the inlet 38 (where rotation slightly past such alignment could cause trapping of the pig on the pig diverter means). Information can be obtained about the particular geographic location, as to the directions and intensities of prevailing winds and currents, and as to the direction in which the vessel would be urged under the combined influence of the prevailing winds and currents. A compass direction of the vessel from the fluid swivel can be determined, which the vessel is least likely to assume under the combined influence of prevailing winds and currents. The rotatable swivel part is positioned with respect to the mooring device, so the outlet such as 42, seldom lies substantially aligned with the inlet such as 38 (at which position there is danger of pig trapping if the outlet turns a few degrees past this position), and lies at this position only when the vessel lies at the least likely position which it would assume under the combined influence of prevailing winds and currents. Actually, the orientation of the rotatable fluid swivel part to the mooring device may be determined during initial design, and the orientation of the nonrotatable fluid swivel part is chosen to cause a nonpiggable vessel orientation at the least likely position to be assumed.

Thus, the invention provides a multi-chamber fluid swivel which can pass a pig therethrough. This is accomplished by utilizing an annular chamber of largely circular cross section to assure that a pig will be pushed along, and by utilizing a pig diverter device beside the outlet from which fluid and the pig exit from the annular chamber, with the diverter device lying on the downstream side of the outlet. The upstream side of the outlet is preferably oriented so it is tangent to the periphery of the annular chamber, so that the pig tends to move into the outlet even if not diverted to do so, by reason of centrifugal force as well as by the tendency of the pig to extend straight. The pig diverter can include a projection on the downstream side of the outlet, which projects into the annular chamber to deflect a pig into the outlet. The projection can be allowed to extend only partially across the width of the annular chamber, to a position no further than the interface between the swivel parts, to permit disassembly of the fluid swivel without necessitating withdrawal of the projection. The pig diverter can include a shut-off valve which has a valve member movable across the interface between the swivel parts, to stop a high proportion of flow past the valve, with the valve member being withdrawable behind the interface to permit disassembly of the fluid swivel. The part of the fluid swivel having an outlet, can be formed with a deeper recess than the other swivel part, so that the interface is off of the center of the largely circular cross section of the annular chamber, to provide more room for the projection and/or the shut-off valve.

Although particular embodiments of the invention have been described and illustrated herein, it is recognized that modifications and variations may readily occur to those skilled in the art and consequently, it is intended that the claims be interpreted to cover such modifications and equivalents.

I claim:

1. In an offshore installation which includes a rotatable vessel mooring device which moors a vessel while allowing drifting of the vessel under the influence of winds, currents and waves including prevailing winds and currents, and where fluid cargo can be transferred between an undersea conduit and a moored vessel through a fluid swivel that includes a nonrotatable part connected to the undersea conduit and a rotatable part rotatable about the nonrotatable part and connected by a conduit to the vessel, and wherein the fluid swivel is piggable and includes an annular chamber formed between the rotatable and nonrotatable parts, an inlet formed in the nonrotatable part through which fluid and a pig can enter the annular chamber and an outlet formed in the rotatable part through which the fluid and pig can exit the annular chamber, and wherein the rotatable part has a pig diverter means at or near the outlet to assure the entrance of the pig into the outlet, but with the diverter means extending into and at least partially blocking the annular chamber so that the diverter means can prevent a pigging operation when the rotatable part is oriented so the inlet and outlet are slightly past a position of alignment, the improvement wherein:

means maintaining said rotatable fluid swivel part outlet oriented with respect to said mooring device and said nonrotatable fluid swivel part inlet so that the outlet axis lies substantially aligned with the inlet axis when the vessel lies at the least likely position which it would assume under the combined influence of prevailing winds and currents such that said pig entering said inlet will not directly encounter said diverter means and be blocked from exiting said outlet.

2. A piggable fluid swivel apparatus comprising:

first and second swivel parts, one of said swivel part rotatable about an axis of rotation with respect to the other swivel part, said swivel parts having adjacent faces forming an interface, and said faces forming an annular chamber, said first swivel part having an inlet for delivering fluid to said chamber and said second swivel part having an outlet for removing fluid from said chamber; and pig diverter means lying beside said outlet for at least partially shutting off the flow of fluid through a portion of said chamber which lies closely downstream from said outlet;

said diverter means including a valve mounted on said second swivel part and having a valve member moveable within said chamber between a closed position wherein said valve member extends across said interface to block fluid flow and an open position wherein said valve member extends no further than said interface to avoid interference with disassembly of the fluid swivel.

3. The apparatus described in claim 2 wherein:

said valve includes a mount held on said second swivel part and lying on the inside of said chamber, said valve member being moveably mounted on said mount, and said valve also includes an actuator having one end lying in said chamber and connected to said valve member to move it, and another end extending through a hole in said second swivel part at a location spaced from said outlet to permit movement of valve member from the outside of the chamber.

4. The apparatus described in claim 2 wherein:

said pig diverter means includes a fixed projection lying on the downstream side of said outlet and extending no further across said chamber than said interface, said valve lying downstream of said projection.

5. A piggable fluid swivel apparatus comprising:

inner and outer swivel parts, said outer swivel part rotatable about an axis of rotation around said inner swivel part, said swivel parts having adjacent faces forming an interface, and said faces forming an annular chamber of largely circular cross-section, said inner swivel part having an inlet coupled to said chamber and said outer swivel part having an outlet coupled to said chamber;

said outlet extending at least partially tangential to said annular chamber, and having upstream and downstream sides;

said outer swivel part having a pig diverter device lying largely on the downstream side of the outlet, said diverter device includes a projection which extends into said annular chamber of largely circular cross-section, but which extends no further than the interface between said swivel parts during use of said diverter device, whereby to enable removal of the outer swivel part by moving it axially with respect to the inner swivel part without having to first withdraw the diverter device.

6. The apparatus described in claim 5 wherein:

said inner and outer swivel parts each have a recess in its face respectively forming inner and outer portions of the annular chamber, the recess in said outer swivel part being deeper than the recess in said inner swivel part, and said pig diverter device having a portion lying further from the bottom of the recess in said inner swivel part than does the centerline of said annular chamber.

7. A piggable fluid swivel apparatus comprising:

inner and outer swivel parts, said outer swivel part rotatable about as axis of rotation around said inner swivel part, said swivel parts having adjacent faces forming an interface, and said faces forming an annular chamber of largely circular cross-section, said inner swivel part having an inlet coupled to said chamber and said outer swivel part having an outlet coupled to said chamber;

said outlet extending at least partially tangential to said annular chamber, and having upstream and downstream sides;

said outer swivel part having a pig diverter projection lying largely on the downstream side of the outlet, and extending partially across said annular chamber at least some of the time;

said adjacent faces of said inner and outer swivel parts each have a recess forming part of a largely circular cross-section chamber, said face of said outer swivel part forming more than half the width of said chamber, and said projection extending across more than half the width of the chamber cross-section but not beyond the interface between said inner and outer swivel parts at least some of the time.

8. The apparatus described in claim 7 wherein:

the recess in said outer swivel part, as seen in cross-section, forms substantially half of a circle on the radially outer side of the chamber centerline and forms largely straight parallel sides on the radially inner side of the chamber centerline.

9. A piggable fluid swivel apparatus comprising:

inner and outer swivel parts, said outer swivel part rotatable about an axis of rotation around said inner swivel part, said swivel parts having adjacent faces forming an interface, and said faces forming an annular chamber of largely circular cross-section, said inner swivel part having an inlet coupled to said chamber and said outer swivel part having an outlet coupled to said chamber;

said outlet extending at least partially tangential to said annular chamber, and having upstream and downstream sides;

said outer swivel part having a pig diverter device lying solely on the downstream side of the outlet;

the upstream side of said outlet is smoothly tangent to the periphery of said annular chamber, as seen in both a vertical plane which includes said axis of rotation and in a horizontal plane to which said axis is normal, to enable pig movement from said chamber to said outlet by smooth tangential movement of the pig out of a continuously curved path, without requiring pig movement in reverse curvature to enter the outlet or to overcome any obstruction.

10. A piggable fluid swivel apparatus comprising:

inner and outer swivel parts, said outer swivel part rotatable about said inner swivel part, and said swivel parts having adjacent faces forming an annular chamber of largely circular cross-section, said inner swivel part having an inlet coupled to said chamber and said outer swivel part having an outlet coupled to said chamber;

said outlet having a centerline extending tangential to the centerline of said annular chamber, said outlet having an upstream side extending even with and tangent to the radially outer surface of said chamber, and said outlet having a downstream side;

said outer swivel part having a pig deflector lying substantially even with and on the downstream side of an extension of the downstream side of the outlet.

* * * * *